(12) United States Patent
Lukenich

(10) Patent No.: US 7,205,689 B2
(45) Date of Patent: Apr. 17, 2007

(54) ELECTRIC MOTOR WITH SPACE-SAVING LOW-RESISTANCE NEUTRAL RING

(75) Inventor: Stefan Lukenich, Singen (DE)

(73) Assignee: ebm-papst St. Georgen GmbH & Co., St. Georgen (DE)

( * ) Notice: Subject to any disclaimer, the term of this patent is extended or adjusted under 35 U.S.C. 154(b) by 0 days.

(21) Appl. No.: 10/903,035

(22) Filed: Jul. 29, 2004

(65) Prior Publication Data

US 2005/0023910 A1    Feb. 3, 2005

(30) Foreign Application Priority Data

Aug. 2, 2003   (DE) ................................ 103 35 846

(51) Int. Cl.
     *H02K 11/00*    (2006.01)
     *H02K 3/00*    (2006.01)
     *H02K 1/18*    (2006.01)

(52) U.S. Cl. ........................................ 310/71; 310/179

(58) Field of Classification Search .................. 310/71, 310/218, 179, 180, 260
See application file for complete search history.

(56) References Cited

U.S. PATENT DOCUMENTS

| | | | | |
|---|---|---|---|---|
| 5,828,147 | A | * | 10/1998 | Best et al. ..................... 310/71 |
| 5,900,687 | A | * | 5/1999 | Kondo et al. .................. 310/71 |
| 6,028,383 | A | * | 2/2000 | Ohshita ........................ 310/71 |
| 6,300,697 | B1 | * | 10/2001 | Findeisen et al. .......... 310/68 B |
| 6,369,473 | B1 | * | 4/2002 | Baumeister et al. ........... 310/71 |
| 6,600,244 | B2 | * | 7/2003 | Okazaki et al. ................ 310/71 |
| 6,707,186 | B2 | | 3/2004 | Oppitz ......................... 310/71 |
| 6,856,057 | B2 | * | 2/2005 | Kobayashi et al. ........... 310/71 |
| 2002/0047369 | A1 | * | 4/2002 | Yoshida et al. ................ 310/81 |
| 2003/0173854 | A1 | | 9/2003 | Oppitz ....................... 310/184 |
| 2004/0135457 | A1 | * | 7/2004 | Holzheu et al. ............. 310/179 |
| 2005/0040716 | A1 | * | 2/2005 | Schmid et al. ................ 310/71 |
| 2005/0189828 | A1 | * | 9/2005 | Nakayama et al. ........... 310/71 |

FOREIGN PATENT DOCUMENTS

| | | | |
|---|---|---|---|
| DE | 101 52 006 | | 5/2003 |
| JP | 03145949 A | * | 6/1991 |
| JP | 06014489 A | * | 1/1994 |
| JP | 06022486 A | * | 1/1994 |
| JP | 2001103700 A | * | 4/2001 |
| JP | 2002078272 A | * | 3/2002 |

OTHER PUBLICATIONS

Esp@cenet bibliographic data sheet indicating correspondence between OPPITZ documents, May 2003.

\* cited by examiner

*Primary Examiner*—Darren Schuberg
*Assistant Examiner*—Erik Preston
(74) *Attorney, Agent, or Firm*—Milton Oliver; Ware Fressola Van Der Sluys & Adolphson LLP

(57) ABSTRACT

A compact electric motor has a rotor, and a stator (10) having a slotted lamination stack (16) defining slots separated by teeth, the teeth having tooth heads (153). Partial windings (17) are arranged on the teeth. On at least one axial end of said lamination stack, jumper rings (11, 12, 13) and a neutral ring (14) are arranged. The neutral ring has a plurality of inwardly extending radial projections (141) having free ends (142) adapted for connection to ends (171) of the partial windings (17). Connection of partial windings (17) in parallel provides a favorable power/size ratio and substantial power output, even with low operating voltage.

12 Claims, 10 Drawing Sheets

ELECTRIC MOTOR WITH SPACE-SAVING LOW-RESISTANCE NEUTRAL RING

FIELD OF THE INVENTION

The prevent invention relates to a stator configuration for an electric motor.

BACKGROUND

In known electric motors, making the connections to the individual windings often leads to problems, such as connecting wires taking up excessive space and being difficult to mount.

SUMMARY OF THE INVENTION

It is therefore an object of the invention, to provide an electric motor structure which overcomes these problems. According to the invention, this object is achieved by providing an electrical neutral or star-point in the form of a ring, having radial inward projections for making connections to partial windings, and connecting a plurality of partial windings in parallel with each other, to serve as each phase.

Such an electric motor has the advantage, that the assembly of the stator stack with annular jumper rings and the neutral or star-point ring is greatly simplified and the thus-achieved electric connection of the partial windings needs little space. Further, the structure gives the current a high level of symmetry, and losses, arising from differing total resistances of the partial windings are minimized.

Such an electric motor makes possible a winding of the partial windings, in which the second ends of the partial windings are simply connected to contact projections of the neutral ring.

Further details and advantageous refinements of the invention will be apparent from the following description of preferred embodiments, which are not to be construed as limitations of the invention.

BRIEF FIGURE DESCRIPTION

Figure 1:
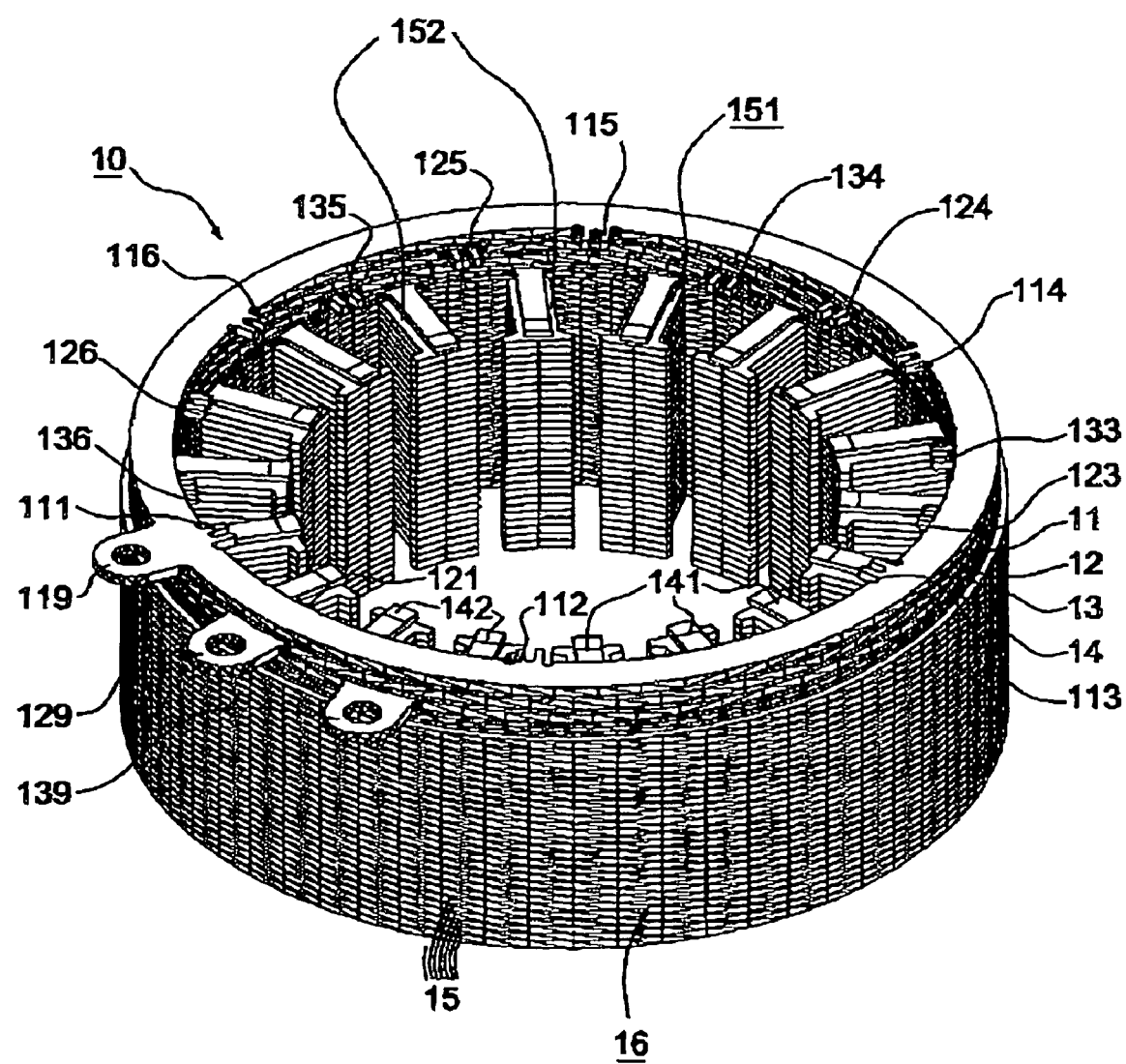
Figure 2:
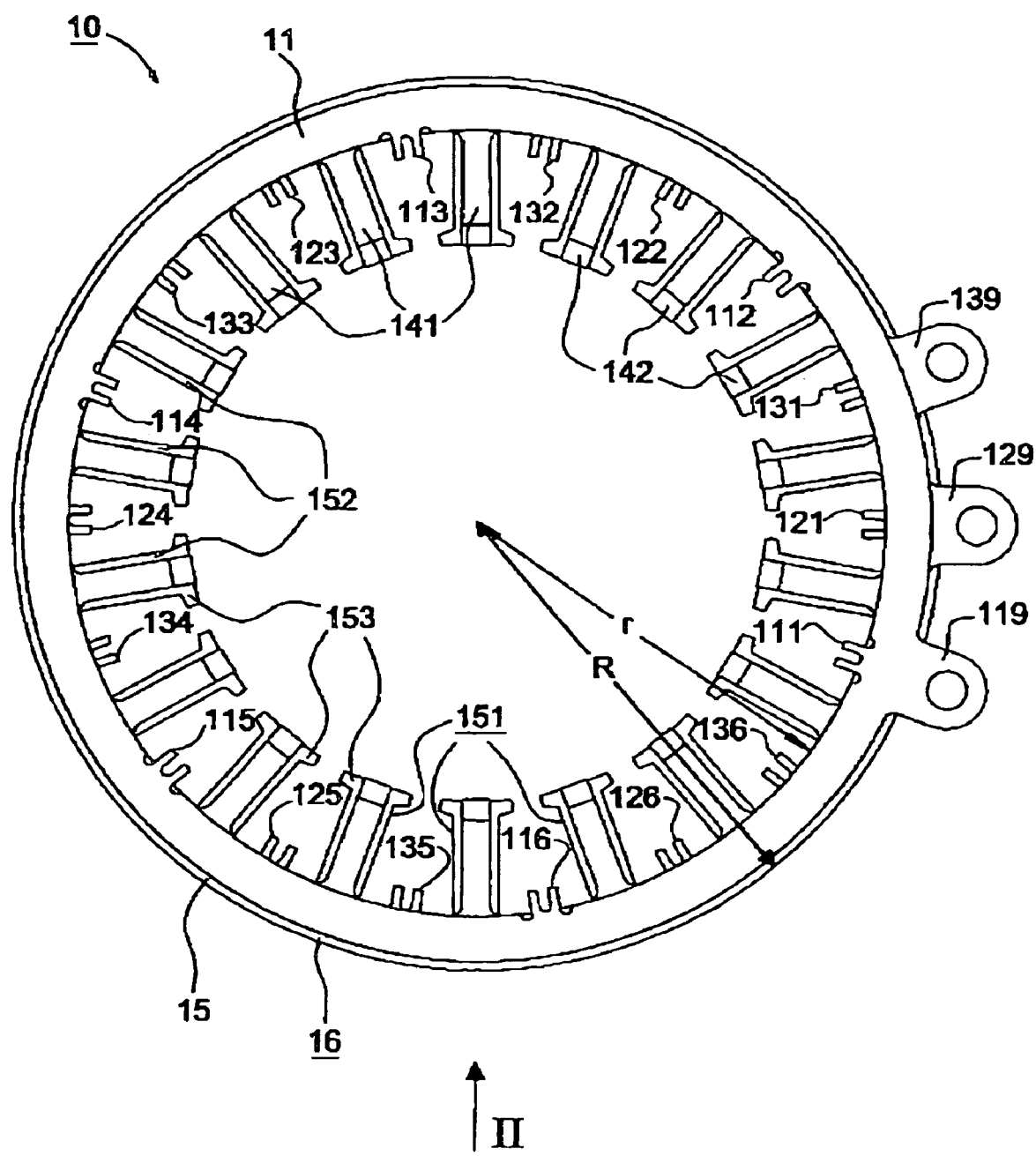
Figure 3:
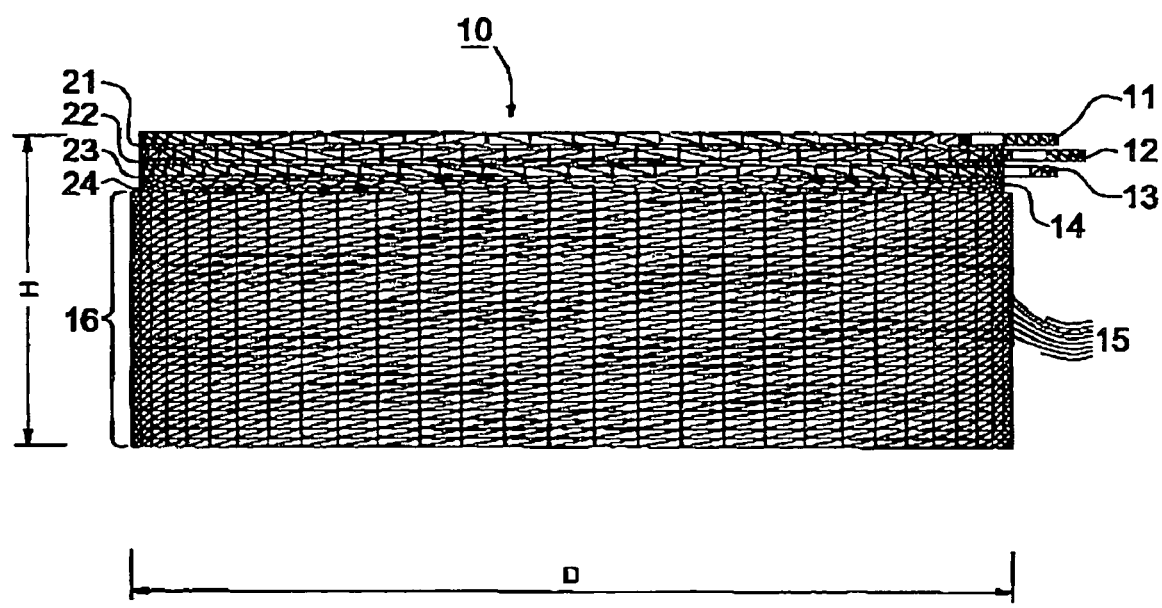
Figure 4:
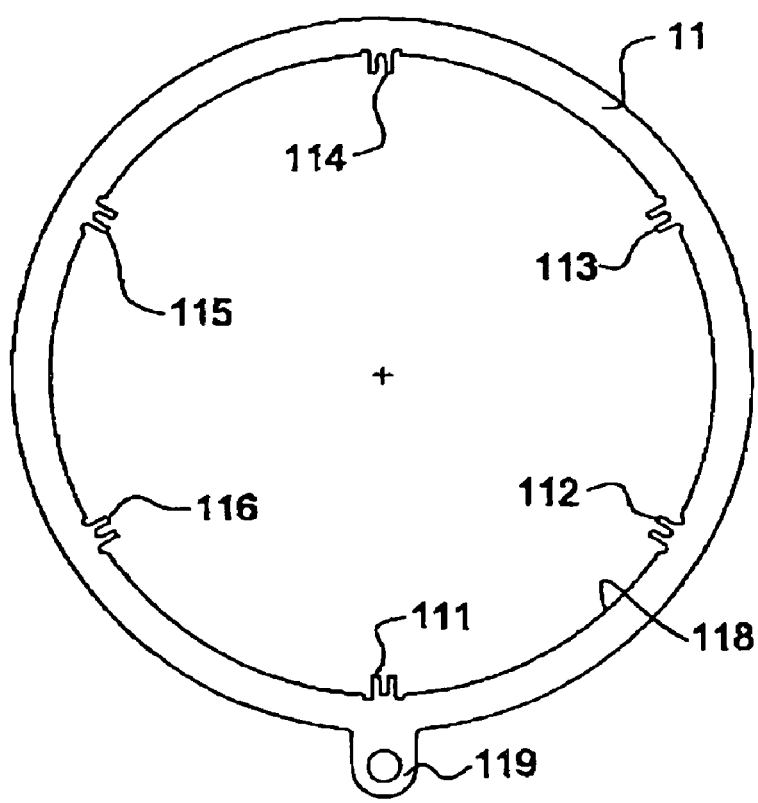
Figure 5:
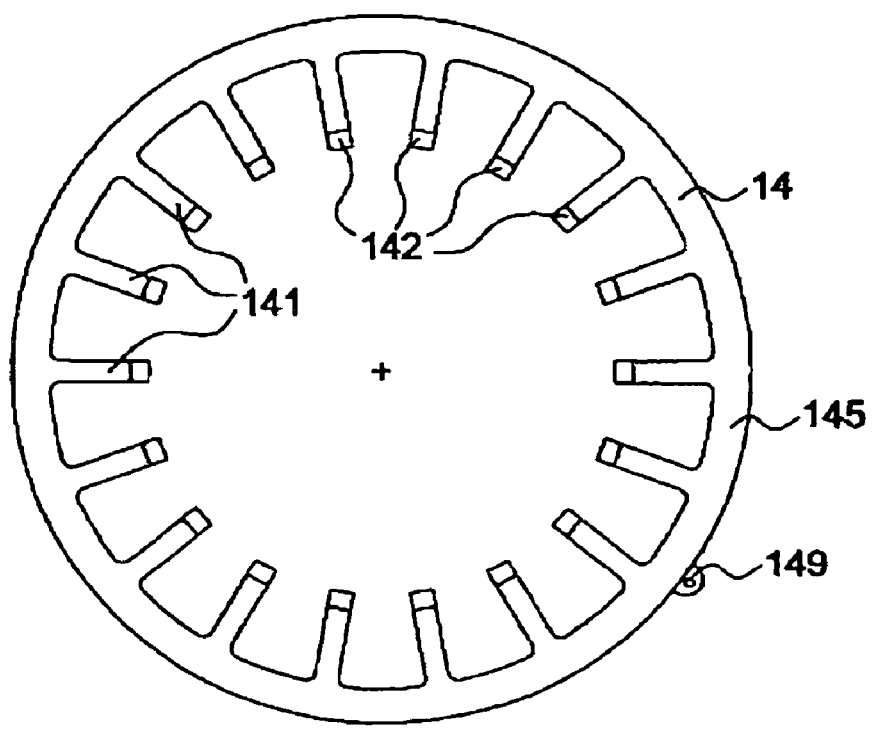
Figure 6:
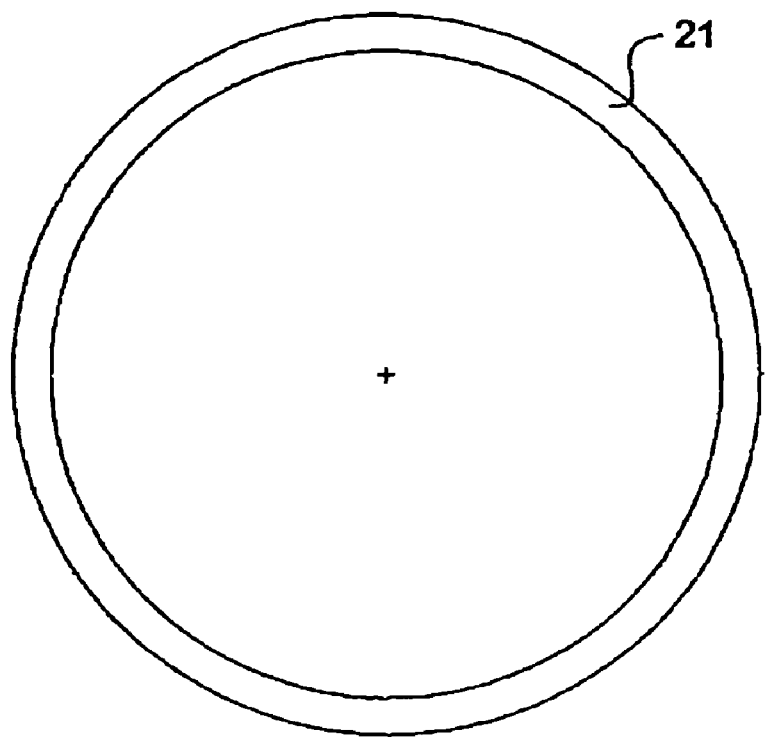
Figure 7:
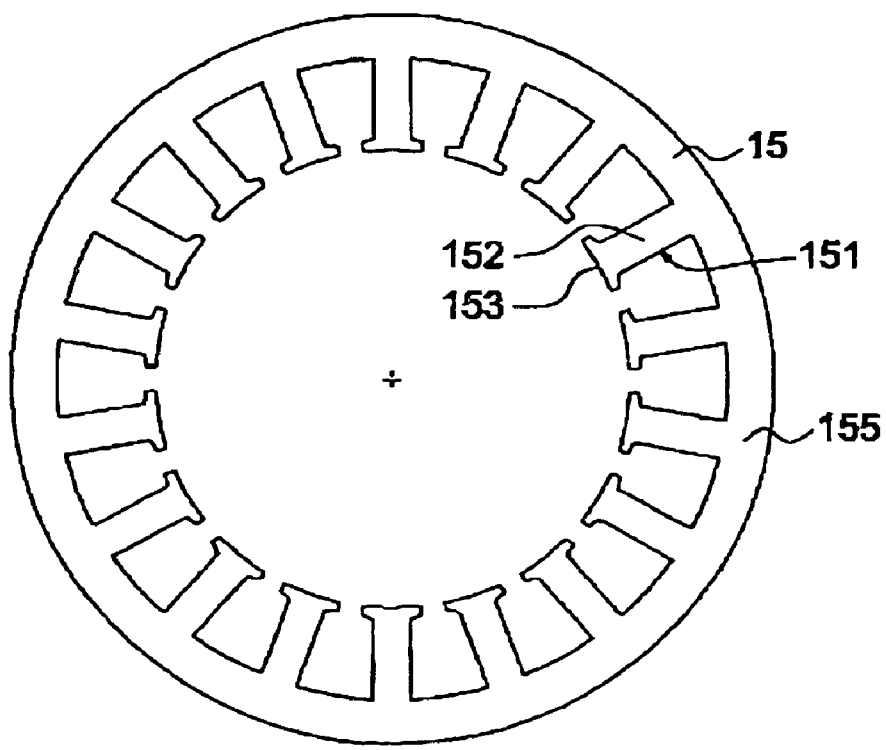
Figure 8:
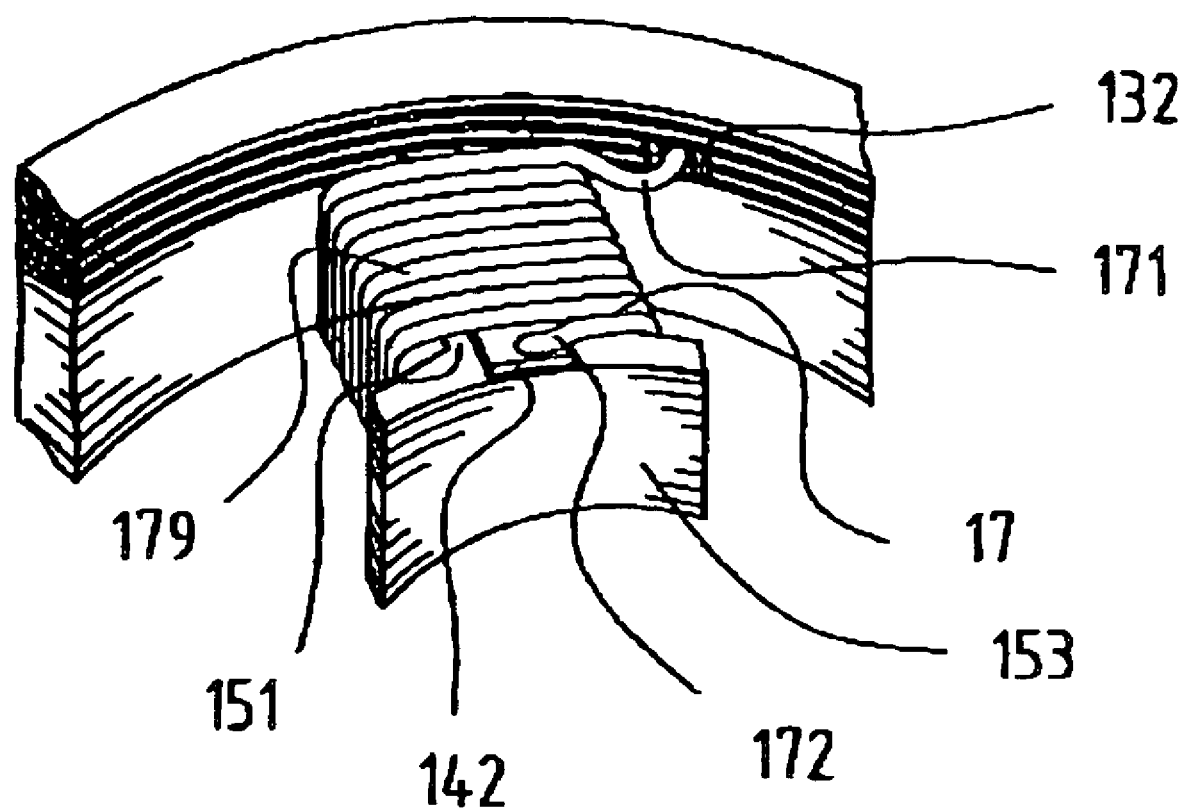
Figure 9:
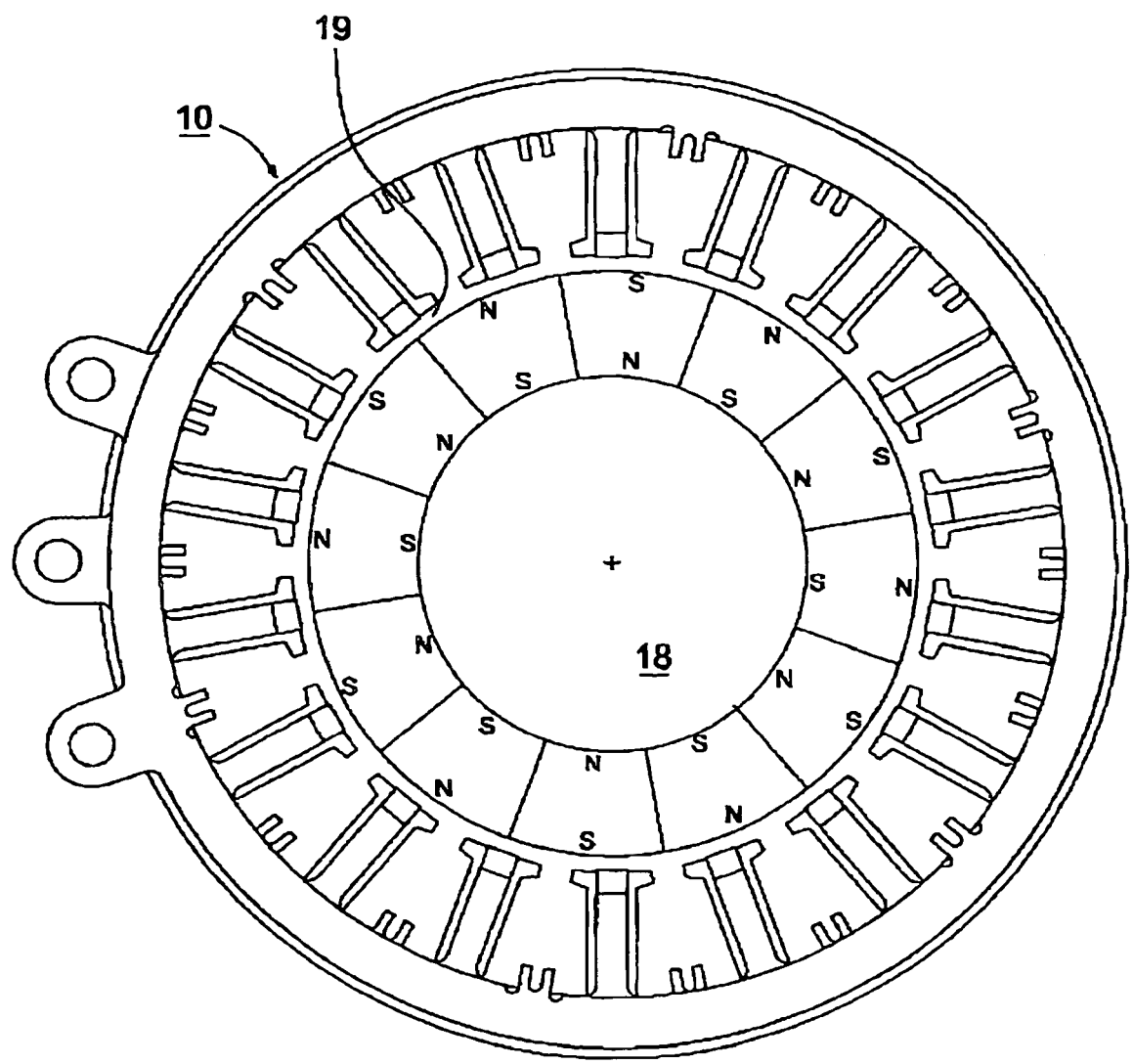
Figure 10:
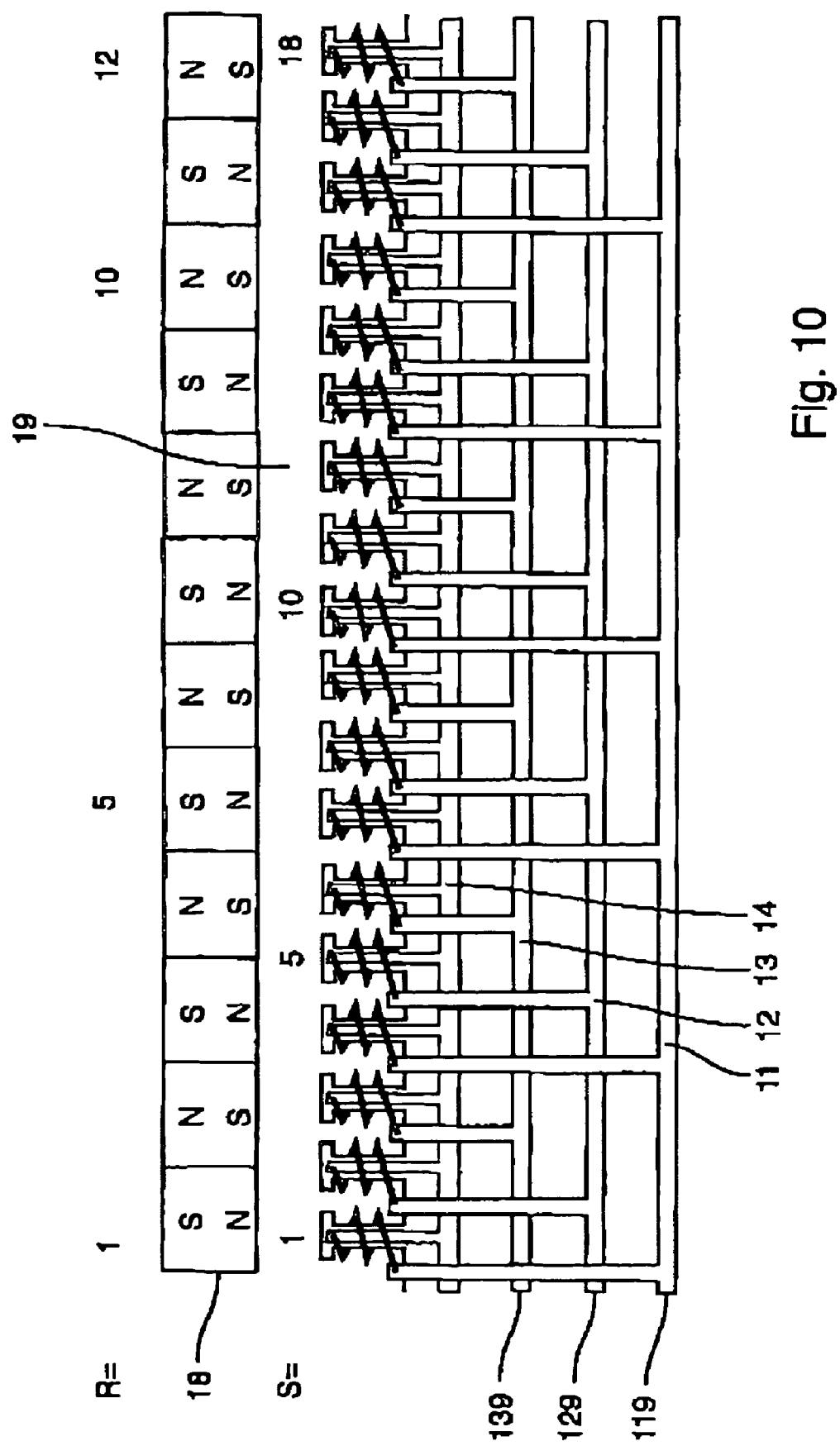
Figure 11:
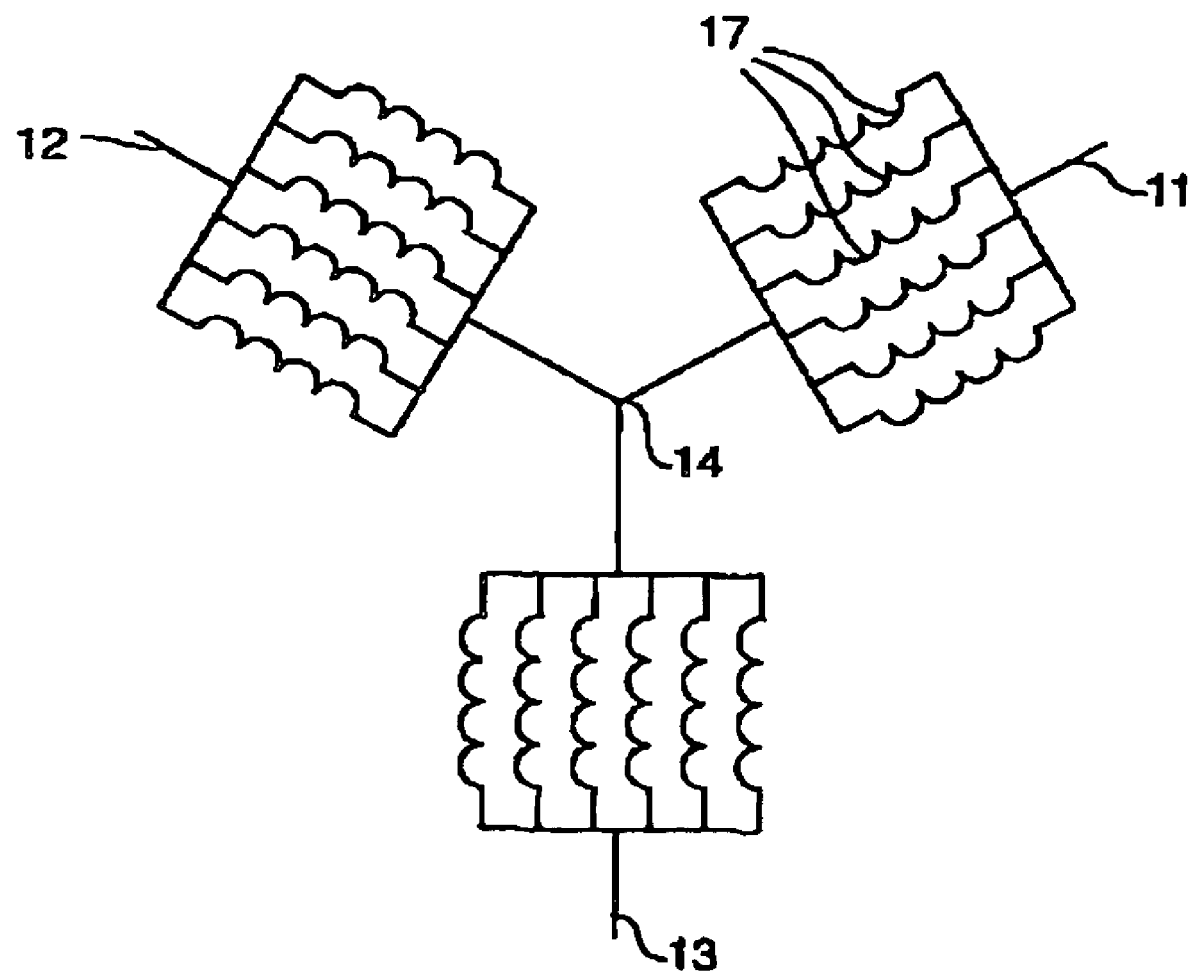
Figure 12:
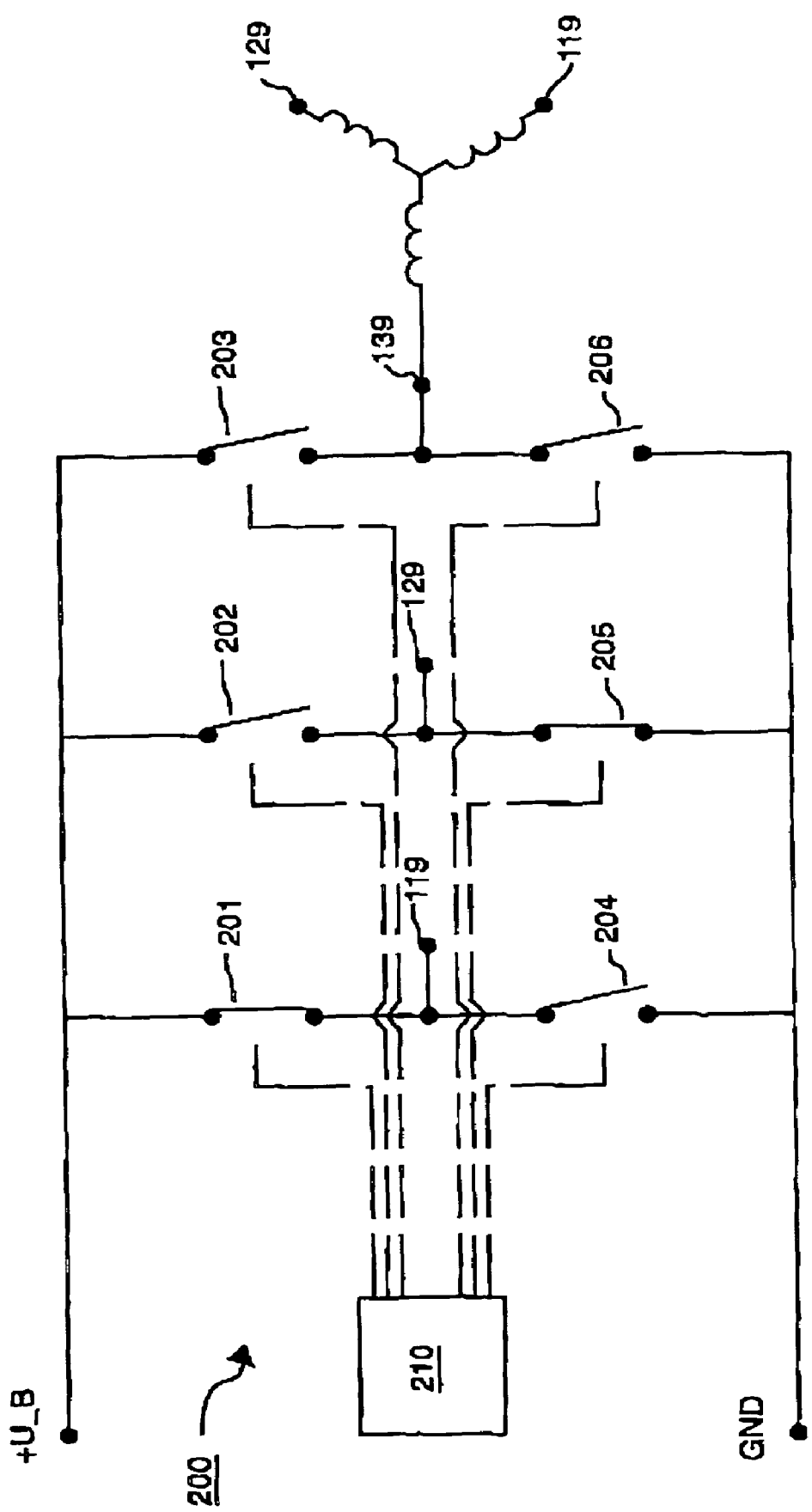

FIG. 1 is a perspective view of the stator of the invention;
FIG. 2 is a plan view of the stator of FIG. 1;
FIG. 3 is a side view of the stator from direction II of FIG. 1;
FIG. 4 is a plan view of a jumper ring;
FIG. 5 is a plan view of a star-point or neutral ring;
FIG. 6 is a plan view of an insulator ring;
FIG. 7 is a plan view of a star-point or neutral ring;
FIG. 8 is a perspective view of a stator tooth with a partial winding thereon;
FIG. 9 is a plan view of an electric motor having the stator of FIG. 2 and a 12-pole permanent magnet rotor;
FIG. 10 is a schematic view of the electric motor of FIG. 9 in a developed form;
FIG. 11 is a schematic view of the star-point arrangement of the stator in electrical terms; and
FIG. 12 is a schematic view of a power stage in the form of a full-bridge circuit.

DETAILED DESCRIPTION

FIG. 1 is a perspective view of a stator 10 in accordance with the present invention, and FIG. 2 is a plan view of the stator 10 of FIG. 1.

For end connections, stator 10 has three jumper rings 11, 12, 13, a star-point or neutral ring 14, a lamination stack 16 composed of multiple stator laminations 15, eighteen teeth (stator poles) 151 with tooth shanks 152 and tooth heads 153, and eighteen partial windings 17 (shown in FIG. 8)

As shown in FIG. 4, jumper ring 11 has six contacts 111 through 116 and a projecting terminal 119. Jumper ring 12 has six contacts 121 through 126 and a terminal 129, and jumper ring 13 has six contacts 131 through 136 and a terminal 139.

Star-point ring 114 (FIG. 5) has eighteen contacting projections 141 which each have a respective contacting end 142 adjacent to tooth heads 153. Lamination stack 16 is, in this exemplary embodiment, composed of twenty-eight stator laminations 15 arranged concentrically with each other.

Stator 10 is shaped essentially like a hollow cylinder, and can have, for example, a height H=26 mm or H=30 mm and an outer diameter D=80 mm. For purposes of clearer illustration, the view in FIG. 1 exaggerates the height. The width of the annular (hollow cylindrical) part 155 (see FIG. 7) of stator laminations 15, measured from the inner radius r to the outer radius R of stator 10, is about 4.5 mm in this exemplary embodiment.

FIG. 3 is a side view of stator 10 seen from direction II of FIG. 2. Stator 10 has, as its base body, the lamination stack 16 of ferromagnetic material, e.g. soft iron.

On the lamination stack 16, there are arranged an insulator ring 24, the star-point ring 14, an insulator ring 23, jumper ring 13, an insulator ring 22, jumper ring 12, an insulator ring 21, and jumper ring 11. Insulator rings 21–24 consist of an insulator, e.g. ceramic, resin, or plastic.

Jumper rings 11–13 and star-point ring 14 are made of an electrically conducting material, e.g. copper, and are electrically insulated from each other, and with respect to lamination stack 16, by the insulator rings 21–24.

The complete height H of the stator arrangement in this exemplary embodiment is 30 mm. This height adds up as follows:

Height of stator laminations: 28*0.86 mm=24 mm
Height of jumper rings: 3*1 mm=3 mm
Height of the star-point ring:=1 mm
Height of the insulator rings: 4*0.5 mm=2 mm FIG. 4 is a plan view of a jumper ring 11 of the invention. Jumper ring 11 defines a hollow cylindrical region 118, from which the six contacts 111 through 116 project radially inwardly, and terminal 119 projects radially outward. Onto each of respective contacts 111 through 116, an end of a partial winding 17 attaches. As shown, each of contacts 111 through 116 is formed as a U-shape into which the winding wire can be secured.

Jumper ring 11 is, at least in its annular part 118, flat, and preferably has a height in the range 0.6 mm to 1.3 mm. Preferably, jumper ring 11 has, in its annular (hollow cylindrical) region 118, substantially the same width as the annular region 155 (see FIG. 7) of stator laminations 15. Thereby, the jumper ring has a large cross-section and low resistance. Jumper rings 12 and 13 have the same structure.

FIG. 5 is a plan view of the star-point ring 14. The star-point ring 14 forms the electrical neutral for the partial windings 17 and is—unusually for a neutral point—formed as a ring. The contacting projections 141 extend on top of the lamination stack 16 and to the tooth heads 153 (FIG. 2) and serve for contacting of one end of the partial windings wound around the teeth. For this purpose, the contacting projections 141 each have a respective contacting end 142, which is adapted for contacting and is not electrically insulated. The remainder of each contacting projection is preferably electrically insulated, in order to avoid short-circuit of the winding wire. For insulating purposes, a protective varnish or lacquer is suitable.

Preferably, star-point ring 14 (FIG. 5) is formed with a terminal 149 at which the potential on star-point ring 14 is measured. This facilitates so-called "sensorless detection," according to which the rotor position is measured without rotor position sensors.

Star-point ring 14 is flat, at least in its annular part 145, and preferably has a height in the range 0.6 mm to 1.3 mm. Preferably, ring 14 has, in its annular region 145, substantially the same width as the annular region 155 (see FIG. 7) of stator laminations 15. Thereby, ring 14 has a large cross-section and a low resistance.

PIG. 6 is a plan view of insulator ring 21. This is as thin as possible, in order to keep the height of stator 10 small.

In a preferred refinement of the invention, insulator ring 24 and/or insulator ring 23 have projections corresponding to the projections 141 of star-point ring 14, which assure reliable insulation of star-point ring 14 from lamination stack 16 and/or from partial windings 17.

FIG. 7 is a plan view of one of stator laminations 15. Stator lamination 15 has an annular region 155 and eighteen stator teeth 151 which each comprise a centrally projecting tooth shank 152 with a tooth head 153 at its end.

FIG. 8 is a perspective view of a tooth 151 with a partial winding (coil) 17. Coil 17 consists of a winding wire 179 having a first end 171 and a second end 172.

The first end 171 is connected to contact 132 of third jumper ring 13 and the second end 172 is connected to contacting end 142 of star-point ring 14, e.g. by welding.

Coil 17 has, in this exemplary embodiment, 30 turns and the winding wire has a diameter of about 0.7 mm.

The securing of the first and/or second ends 171, 172 to the contacts of jumper rings 11, 12, 13 can be accomplished, for example, by welding, soldering, snap engagement, or by crimping. Contacting by means of extra connectors is also possible.

FIG. 9 is a plan view of an electric motor with a stator 10 according to the invention, and a 12-pole rotor 18. The stator was already described with reference to FIG. 2. There is an air gap 19 between rotor 18 and stator 10.

FIG. 10 is a developed schematic view of the electric motor of FIG. 9. In this example, all the partial windings 17 are wound in the same sense. The stator poles are successively numbered S=1 . . . 18, and the rotor poles are successively numbered R=1 . . . 12.

Current supply of stator poles S=1 occurs via jumper ring 11, current supply of stator pole S=2 occurs via jumper ring 12, current supply of stator pole S=3 occurs via jumper ring 13, and current supply of stator pole S=4 occurs via jumper ring 11 again. This continues in regular sequence through the last stator pole S=18.

FIG. 11 is a schematic view of the star-configured stator winding of stator 10. Star-point ring 14 is at the center, from which radiate the three phases to the jumper rings 11, 12, 13. Each phase consists of six partial windings connected in parallel.

Current is supplied when, at respective times, a selected two of the phases are energized, via jumper rings 11, 12 and/or 13. For example, the stator winding between the "points" 11, 14 and 13 is energized by applying an operating voltage +U_B to jumper ring 11 and applying a ground potential GND to jumper ring 13. The winding between "points" 12 and 14 is not energized at this time.

The parallel connection of the partial windings is particularly advantageous with low-voltage motors, e.g. in autos with 12-volt batteries The maximum power of the motor, for a given voltage, is limited, in particular, by the ohmic resistance of the windings.

In such a motor with three phases, in which each phase consisted of only one strand or wire, a large wire diameter D (wire gauge), of perhaps 2 mm, would be necessary. Such thick wires are very difficult to work with, particularly making the bends needed to wind around the teeth which becomes scarcely possible. Further, such a wire requires a lot of space and results in a stator which has, for its power, high space requirements.

By contrast, the parallel connection of six identical windings (coils) to form one phase, and the star-configuration of the phases, according to the present invention, causes the aggregate resistance of the individual phases to be reduced to ⅙ the value of the resistance of a single partial winding. Thus, even given low voltage, the motor can provide high output power, despite a wire diameter of only, for example, 0.7 mm This results in a favorable power/size ratio.

FURTHER ADVANTAGES OF THE STATOR STRUCTURE

Due to the large cross-sections of the jumper rings 11, 12, 13 and of star-point ring 14, stator 10 is also suitable for high-current applications.

The annular shape of jumper rings 11, 12, 13 and of star-point ring 14 increases the symmetry of the supply from the terminals 119, 129, 139 to the individual contacts. Asymmetries, which contribute to losses, are substantially avoided.

Since each of contacts 112–116, 122–126 and 132–136 which is not sitting directly adjacent one of terminals 119, 129, 139 is supplied with current, from the viewpoint of terminals 119, 129, 139, from both sides, the resistance of jumper rings 11, 12, 13 and of star-point ring 14 is further reduced.

The space required to make connections of the individual windings is very low. Especially shallow motor structures are possible. Prior art structures supplied the windings by using wires instead of rings. Such connection using wires had, in addition to the their higher resistance, the great disadvantage that many wires had to lie atop one another, resulting in greater height and space demands. Further, such connection using wires caused difficulties and costs during manufacture.

Since contacts 111–116, 121–126 and 131–136 of jumper rings 11, 12 and 13 lie radially outside with respect to stator poles 151 and the contacting ends 142 of star-point ring 14 lie radially inside, the individual partial windings 17 can be wound either from radially outside to radially inside, or the reverse. Thus, it is not necessary to wind radially in two directions. However, one could, for example, first wind from radially outside to radially inside, then the reverse, and then wind again from radially outside to radially inside.

Contacts 111–116, 121–126 and 131–136 are the only portions of jumper rings 11, 12, 13 which project into the interior of stator 10. All other parts of jumper rings 11, 12, 13 lie radially outside. This is advantageous, since thereby the entire inner region of stator 10 is available to the stator poles 151 and to rotor 18. The manufacture of stator 10 is made simple by the manner of winding, and therefore economical.

FIG. 12 is a schematic illustration of a power stage arrangement 200. It has three upper switches 201, 202, 203 and three lower switches 204, 205, 206 which are driven by a driver stage 210. Stage 210 specifies whether or not the supply voltage U_B and the ground potential GND are to he applied to the respective terminals 119, 129, 139 of jumper rings 11, 12, 13. This kind of circuit is called a "full bridge" circuit.

Naturally, many variations and modifications are possible within the scope of the inventive concept, so the invention is not limited to the specific exemplary embodiments described.

What is claimed is:

1. An electric motor having a multiphase winding with a neutral connection, comprising
    a rotor (18) and a stator (10), said stator having a stack (16) of slotted essentially planar laminations defining a plurality of slots that are separated by teeth, said teeth having free ends (153);
    partial windings (17) of said multiphase winding being arranged on said teeth;
    said laminations having at least one end face on which are arranged a plurality of jumper rings (11, 12, 13) and a ring (14) forming said neutral connection, said jumper rings and said ring (14) forming the neutral connection being made of flat conducting metal, extending in parallel with the laminations, and being insulated from the laminations and from each other,
    said ring forming said neutral connection (14) being formed with a plurality of radial extensions (141) which extend along predetermined stator teeth (151) substantially to the free ends (153) thereof and inside of the partial winding on the respective tooth, are insulated from said teeth, and are connected at their free ends (142) to one end (172) of a partial winding formed on a respective tooth.

2. The electric motor of claim 1, wherein
    each partial winding (17) has first end and a second end, said first end (171) connecting to an associated jumper ring (11, 12, 13) and said second end (172) connecting to a free end (142) of an associated radial extension (141) of the ring forming said neutral connection.

3. The electric motor according to claim 1, wherein
    said radial extensions (141) have, at their free ends (142), a conductive segment adapted for making electrical contact with an end of a partial winding (17) arranged on the respective tooth.

4. The electric motor according to claim 1, wherein
    each of said jumper rings (11, 12, 13) is formed with a plurality of contacts adapted for connection to an end (171) of a partial winding (17).

5. The electric motor according to claim 1, wherein
    a plurality of partial windings (17) are connected in parallel to serve as one phase of the multiphase winding.

6. The electric motor according to claim 1, wherein,
    of the plurality of said rings, the ring forming said neutral connection is arranged closer to the laminations than are the jumper rings.

7. The electric motor according to claim 1, wherein said flat conducting metal is copper.

8. The electric motor of claim 1, wherein a winding end (171, 172) is connected to an associated ring by a solder connection.

9. The electric motor of claim 1, wherein a winding end (171, 172) is connected to an associated ring by a snap connection.

10. The electric motor of claim 1, wherein a winding end (171, 172) is connected to an associated ring by a crimping engagement therewith.

11. The electric motor according to claim 1, wherein
    each jumper ring is formed with a central aperture (118) and said laminations are each formed with a central aperture of almost the same diameter as said central apertures (118) of said jumper rings.

12. The electric motor of claim 1, wherein
    each jumper ring is formed with a plurality of radially inwardly projecting contacts for connecting to ends (171) of said partial windings, and each jumper ring is provided with a radially outwardly projecting connector (119).

* * * * *